(12) United States Patent
Simoni

(10) Patent No.: US 7,008,075 B2
(45) Date of Patent: Mar. 7, 2006

(54) SAFETY FLASHLIGHT FOR DOGS

(76) Inventor: Jacquelyn R. Simoni, 15669 Birch Brook Ct., Glen Ellyn, IL (US) 60137

( * ) Notice: Subject to any disclaimer, the term of this patent is extended or adjusted under 35 U.S.C. 154(b) by 96 days.

(21) Appl. No.: 10/749,708

(22) Filed: Dec. 31, 2003

(65) Prior Publication Data

US 2004/0246706 A1    Dec. 9, 2004

Related U.S. Application Data

(60) Provisional application No. 60/484,921, filed on Jul. 2, 2003.

(51) Int. Cl.
*F21V 33/00* (2006.01)

(52) U.S. Cl. ............... 362/108; 362/103; 362/191; 119/859

(58) Field of Classification Search ............... 362/103, 362/108, 190, 191, 234, 251; 119/858, 859
See application file for complete search history.

(56) References Cited

U.S. PATENT DOCUMENTS

| | | | |
|---|---|---|---|
| 2,234,995 A | 3/1941 | Waechter | 240/59 |
| 4,173,201 A | 11/1979 | Chao et al. | 119/106 |
| 4,400,763 A | 8/1983 | Kribs et al. | 362/103 |
| 4,425,600 A | 1/1984 | Barnhart | 362/84 |
| 4,458,299 A | 7/1984 | Stephens et al. | 362/158 |
| 4,625,339 A | 12/1986 | Peters | 2/160 |
| 4,734,834 A | 3/1988 | Petzl et al. | 362/187 |
| 4,812,953 A | 3/1989 | Ask et al. | 362/103 |
| 4,875,145 A * | 10/1989 | Roberts | 362/103 |
| 4,895,110 A | 1/1990 | LoCascio | 119/106 |
| 5,046,456 A | 9/1991 | Heyman et al. | 119/106 |
| 5,056,696 A | 10/1991 | Lahr | 224/148 |
| 5,140,946 A | 8/1992 | Pennock et al. | 119/106 |
| 5,193,896 A | 3/1993 | Oberlander | 362/103 |
| 5,255,168 A | 10/1993 | Stevens | 362/108 |
| 5,359,501 A | 10/1994 | Stevens | 362/108 |
| 5,370,082 A | 12/1994 | Wade | 119/859 |
| 5,535,106 A | 7/1996 | Tangen | 362/108 |
| D379,252 S | 5/1997 | McIntosh | D30/152 |
| 5,630,382 A | 5/1997 | Barbera et al. | 119/859 |
| D394,720 S | 5/1998 | Yuen | D26/39 |
| D405,202 S | 2/1999 | Fattori et al. | D26/39 |
| 5,950,571 A | 9/1999 | Schade | 119/859 |
| 5,967,095 A | 10/1999 | Greves | 119/795 |
| D422,734 S | 4/2000 | Stephens | D26/49 |
| D429,014 S | 8/2000 | Stephens | D26/49 |
| 6,170,968 B1 | 1/2001 | Caswell | 362/469 |
| 6,220,720 B1 | 4/2001 | Stephens | 362/205 |

(Continued)

*Primary Examiner*—Laura K. Tso
(74) *Attorney, Agent, or Firm*—Stephen G. Rudisill; Jenkens & Gilchrist

(57) ABSTRACT

A dog flashlight illuminates the area in front of a dog in dark conditions, thereby eliminating the need for a dog owner to carry and direct a light source. The dog flashlight includes a housing containing at least one light source, a battery power supply for the light source, and a switch connected between the light source and the power supply for energizing and de-energizing the light source. When energized, the light source has sufficient brightness to illuminate the area in front of the dog so that the dog owner can observe the illuminated area for control purposes. One preferred embodiment includes an attachment device having a band carrying the housing and adapted to fit around the neck of the dog so that the housing is located in front of the chest of the dog.

6 Claims, 17 Drawing Sheets

U.S. PATENT DOCUMENTS

| | | | |
|---|---|---|---|
| 6,224,235 B1 | 5/2001 | Parker | 362/190 |
| 6,289,849 B1 | 9/2001 | Macedo et al. | 119/796 |
| 6,341,874 B1 | 1/2002 | Rubin | 362/103 |
| 6,394,040 B1 | 5/2002 | Axel | 119/859 |
| 6,481,869 B1 | 11/2002 | Horandel et al. | 362/251 |
| D470,615 S | 2/2003 | Janice et al. | D26/39 |
| 6,557,498 B1 | 5/2003 | Smierciak et al. | 119/858 |
| 6,695,269 B1 | 2/2004 | Anscher | 248/225 |
| 6,805,460 B1 * | 10/2004 | Zoller et al. | 362/103 |
| 2003/0094145 A1 | 5/2003 | Cheng | 119/859 |

* cited by examiner

SAFETY FLASHLIGHT FOR DOGS

CROSS-REFERENCE TO RELATED APPLICATION

This invention claims the priority of U.S. Provisional Patent Application Ser. No. 60/484,921, filed Jul. 2, 2003, for "DOG COLLAR LIGHT."

FIELD OF THE INVENTION

The present invention relates generally to a safety flashlight for dogs and their owners and, more particularly, to a lightweight device that is attachable to the neck of a dog, and that contains at least one light source for the purpose of illuminating a region in front of the dog and making the dog visible.

SUMMARY OF THE INVENTION

In accordance with the present invention, there is provided a dog flashlight that can be attached to the neck of a dog to illuminate the area in front of the dog in dark conditions, thereby eliminating the need for a dog owner to carry and direct a light source. The dog flashlight includes a housing containing at least one light source (such as a light emitting diode), a battery power supply for the light source, and a switch connected between the light source and the power supply for turning the light source on and off. When turned on, the light source has sufficient brightness to illuminate the area in front of the dog so that the dog owner can observe the illuminated area for control purposes. One preferred embodiment includes an attachment device having a band carrying the housing and adapted to fit around the neck of the dog so that the housing is located in front of the chest of the dog.

It is difficult to hold the dog, a flashlight and a pooper scooper when walking a dog after dark. The present invention makes it easier on the dog walker by making it possible for the dog to carry the flashlight. The dog flashlight of this invention can be made small, lightweight and flat so that it does not bother the dog. The light output is bright enough to light the way and remains oriented so as to illuminate the surroundings in front of the dog. The light source preferably illuminates an area extending at least 10 feet, preferably at least 20 feet, in front of the dog, and can be made to illuminate an area extending as far as 200 feet in front of the dog. The light source also preferably illuminates an area that is at least 5 feet wide at a distance of about 10 feet in front of the dog.

There are several benefits to the dog flashlight:
1. Dog walkers do not have to carry a cumbersome flashlight when walking the dog at night because the dog lights the way.
2. The dog flashlight is designed to illuminate what the dog is looking at or smelling. Therefore, if the dog is sniffing or looking at something potentially hazardous, such as a dead animal or rancid food lying in the road, the dog can be restrained.
3. If dog waste needs to be picked up, the dog flashlight provides illumination for the area.
4. The dog can be seen easily by cars, increasing safety for the dog and the dog walker.

The preferred embodiment of mounted on or incorporated in, the dog's collar, and thus, replaces the need for a person to hold a flashlight when walking a dog at night. The collar on a dog slants down so that a collar mounted light preferably slants upwards, e.g., 30–45 degrees, for the beam of light to shine straight ahead in a horizontal direction. When the light on the collar is slanted up, the nose of the dog gets in the way and forms a shadow. Therefore, the dog collar flashlight preferably has at least three lights: a middle light, which is set straight and therefore shines down on the ground in front of the dog, and two side lights which are spaced approximately an inch from the middle light, depending on the size of the dog, and are slanted upwards so that they shine straight out, around the dogs nose. The collar flashlight uses very bright LEDs (at least 5 mm with 10,000 med intensity) which provide sufficient illumination to serve as a flashlight replacement. The collar flashlight contains an on/off switch and a replaceable battery. The dog collar flashlight is attachable to an existing collar or attached to an elastic band so it can be easily put around the dog's head and taken off.

Another approach is to embed light sources and the LED batteries in a collar. As a further variation a rim may be provided around the LED area so that the dog's hair doesn't get in the way of the light beams.

Yet another approach is to attach the flashlight to a dog collar by means of a hinged clip, so that the flashlight can be adjusted up and down so that light beam remains oriented to illuminate the path in a horizontal direction in front of the dog.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENTS

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

Figure 1:
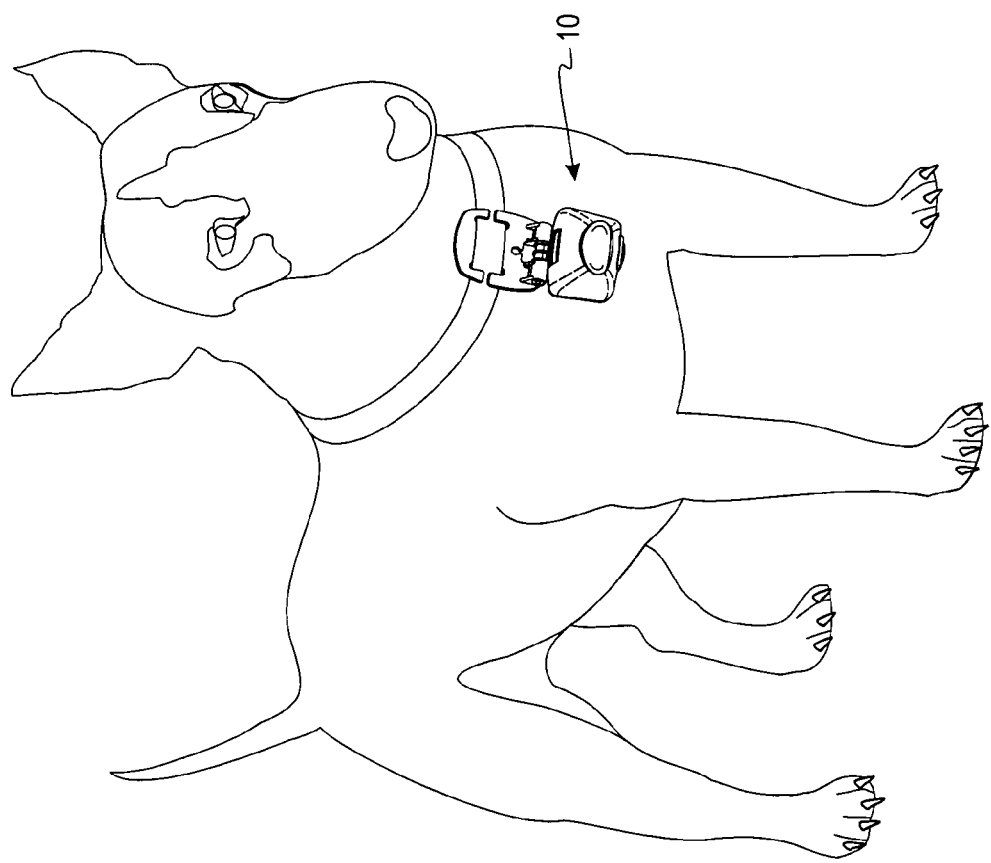
FIG. 1 is a perspective view of a dog wearing a dog flashlight, according to one embodiment of the present invention.
Figure 2:
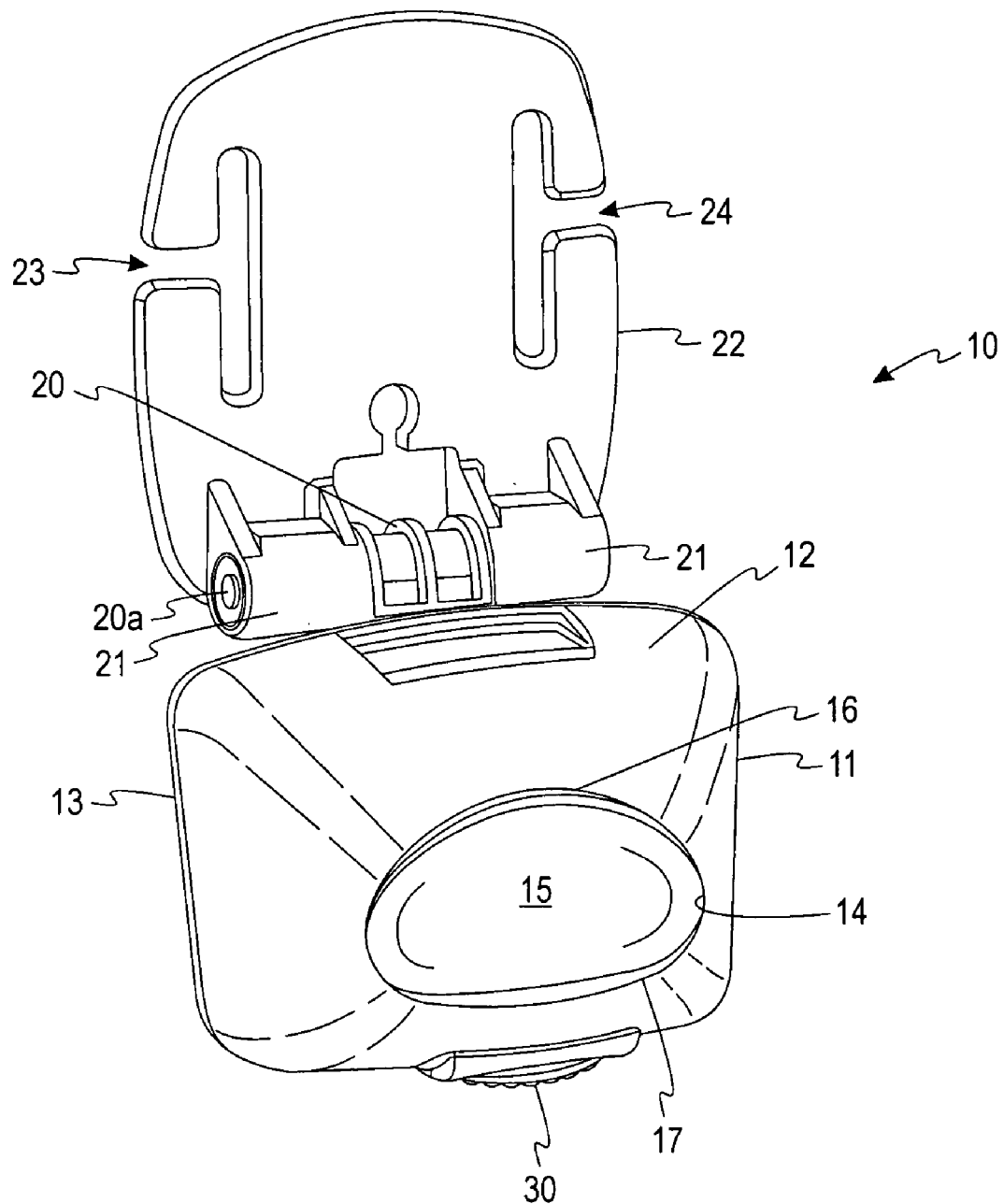
FIG. 2 is an enlarged front perspective view of the dog flashlight shown in FIG. 1.
Figure 3:
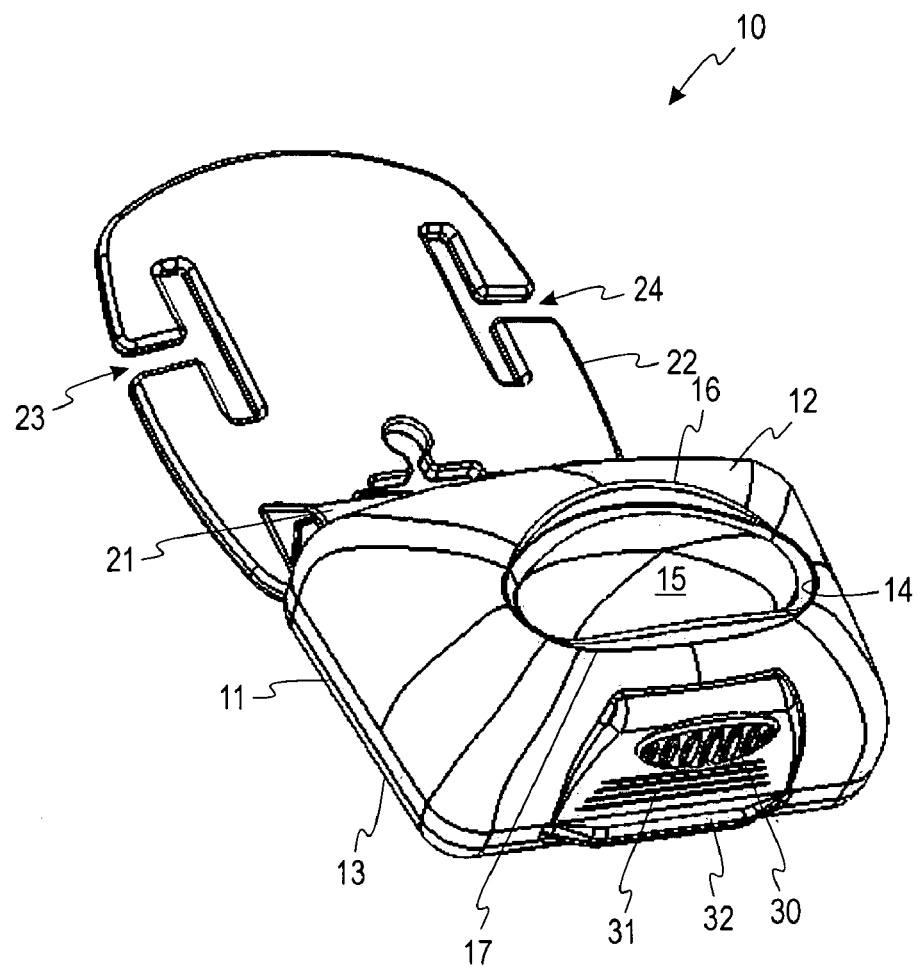
FIG. 3 is a bottom perspective view of the dog flashlight of FIGS. 1 and 2.
Figure 4:
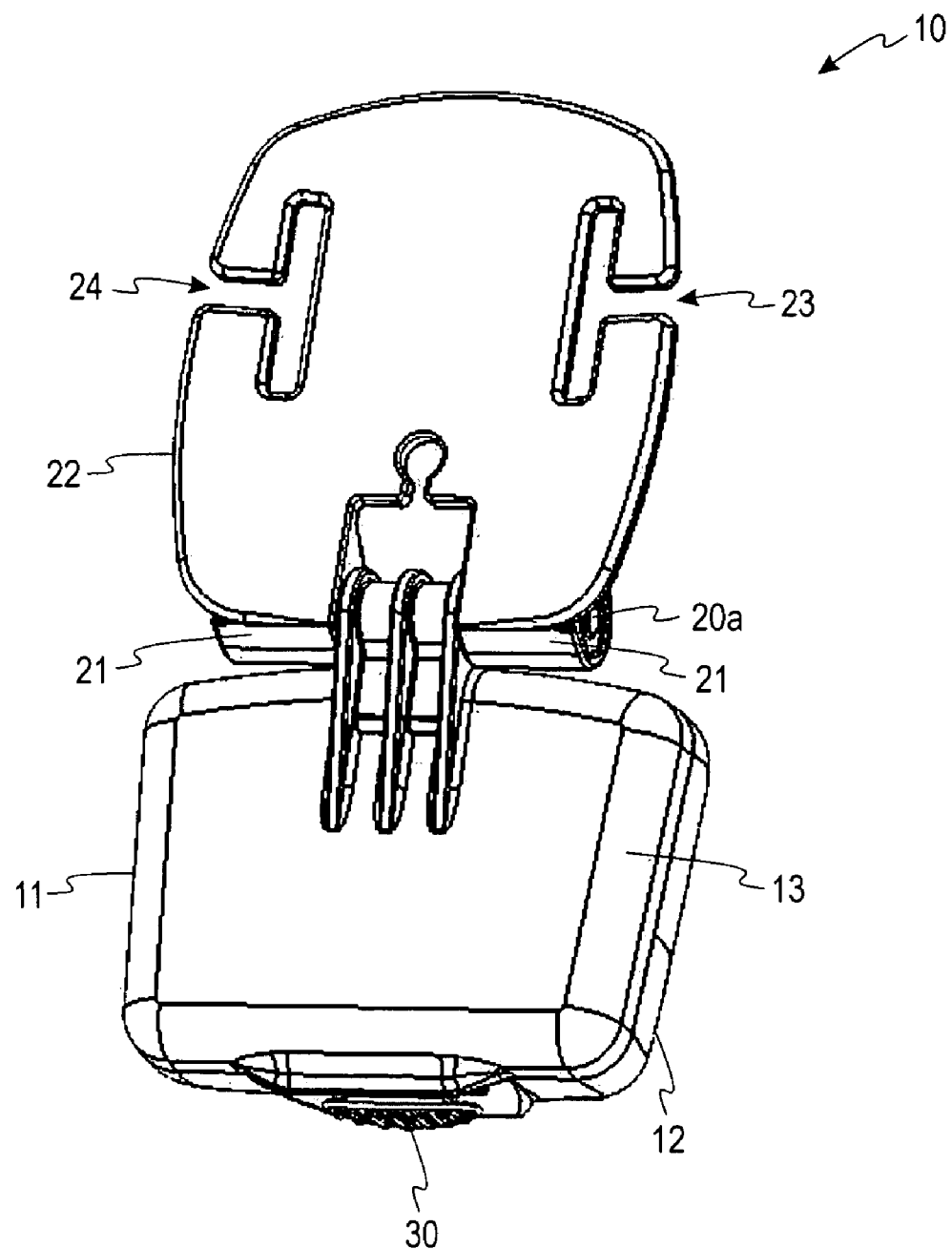
FIG. 4 is a rear perspective view of the dog flashlight of FIGS. 1–3.

Turning now to the drawings, and referring initially to FIGS. 1–5, a dog flashlight 10, according to one embodiment of the present invention, includes a housing 11 made of molded plastic material and adapted to be attached to the neck of a dog (see FIG. 1). The housing includes a front section 12 and a rear section 13 which mate to form an internal cavity to contain the components described below. The front section 12 and the rear section 13 are molded, along their respective joining internal edges, to form a snap fitting of the kind well known in the state of the art. The front and rear sections 12 and 13 may thus be easily taken apart for access to the internal cavity. Alternatively, the two parts may be joined by an integral "living hinge" on one side and form an integral snap-type latch on the opposite side to hold the two sections 12 and 13 together.

The front housing section 12 forms a substantially oval aperture 14 for receiving a translucent or transparent lens 15 through which light from sources inside the housing can be transmitted forwardly from the housing. In the illustrative embodiment, the front housing section forms upper and lower rims 16 and 17 along the upper and lower edges of the aperture 14 to prevent light from being transmitted straight up or down from the aperture. The ends of the aperture, however, are unobstructed so that light can be transmitted laterally directly from the end edges of the aperture 14.

The illustrative dog flashlight 10 forms a unit that may be made small and compact for ease of packaging, handling and use, and to reduce cost. For example, one preferred embodiment uses a housing of approximately 2⅛ inches in the x dimension, 1⅝ inches in they dimension and approximately ⅞ inches thick or deep. It will be understood, however, that the dimensions of the housing may be varied for different shapes and designs.

A hinge section 20 is molded as an integral part of the rear housing section 13, and mates with a complementary hinge section 21 formed as an integral part of an attachment clip 22. A pin 20a is inserted through the two hinge sections 20 and 21 to hold them together while permitting rotational movement of the two hinge sections relative to each other. The opposed surfaces of the two hinge sections 20 and 21 that move relative to each other are roughened to increase the friction between those surfaces, to inhibit swinging movement of the housing 11 and thereby improve the stability of the light beam. Thus, the angular position of the housing 11 can be adjusted relative to the clip 22 to optimize the illuminated area in front of the dog, and the housing will remain in the selected position. The hinge also permits the housing to be rotated 180 degrees so that it lies flat against the clip 22 before the clip is attached to the band used to attach the housing to the dog, thereby providing a shorter unit for use on smaller dogs.

The clip 22 also forms a pair of T-shaped slots 23 and 24 opening through opposite edges of the clip for receiving and holding a band 25 (see FIG. 6) adapted to fit over a dog's neck. The band 25 is preferably made of an elastic material so that it can be used with dogs of varying sizes. When the band 25 is put around the neck of a dog, the band is preferably located below any collar worn by the dog, so as to minimize blockage of light by the dog's snout.

Figure 5:
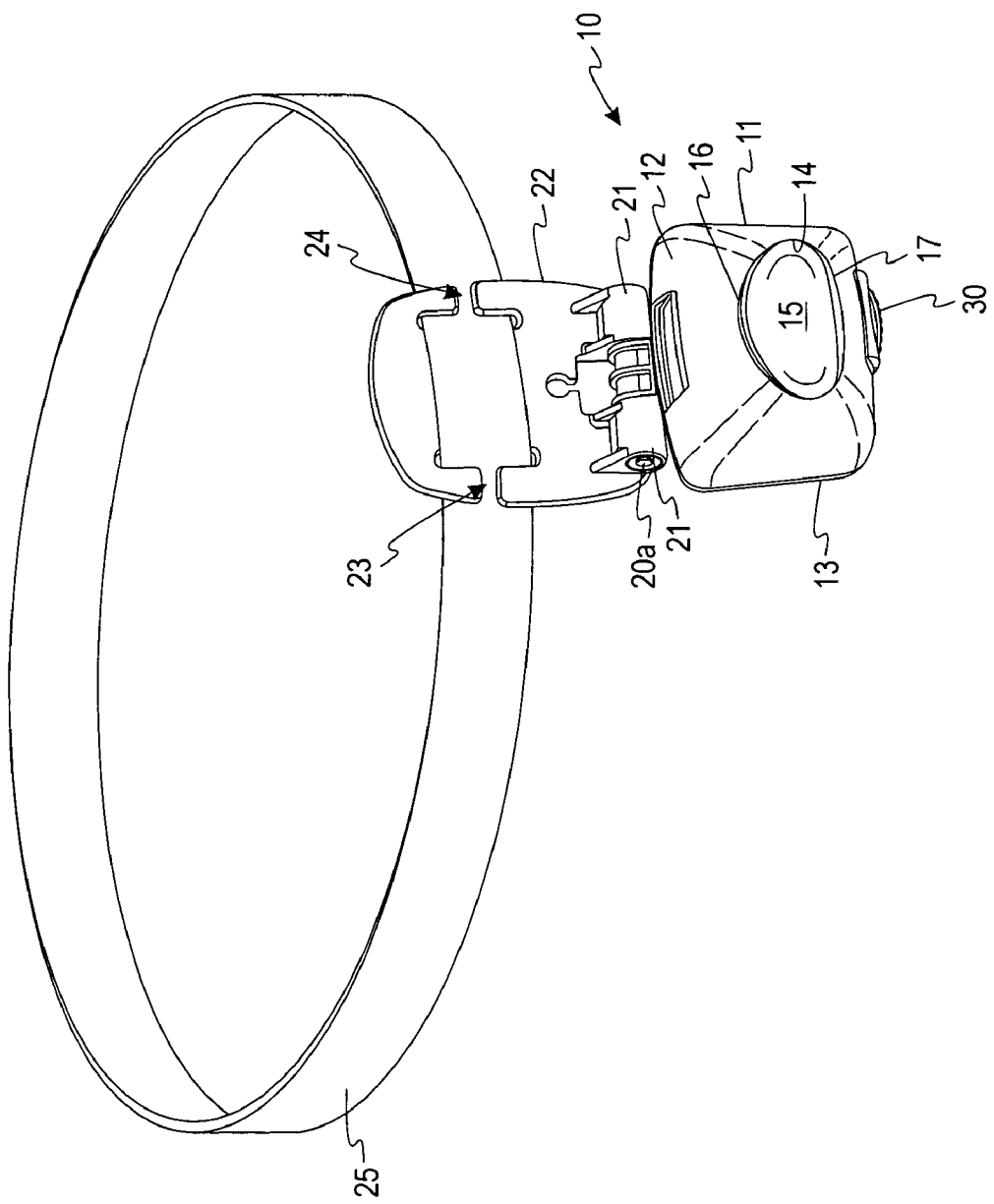
FIG. 5 is a front perspective of the dog flashlight of FIGS. 1–4 attached to an elastic band adapted to fit around a dog's neck.

As can be seen in FIG. 5, the housing 11 depends from the bottom edge of the clip 22, and the lens 15 is located toward the lower end of the housing 11, so that the light emanates from the lens a couple of inches or more below the band 25. This helps avoid blockage of the light by the dog's snout.

An on/off switch 30 is located on the bottom of the front housing section 12. A pattern area 31 and a lip 32 are molded into the housing to provide finger and thumb surfaces that can be felt and gripped when opening the housing 11 to change batteries or to access the interior of the housing for other purposes such as to replace the light sources.

Figure 6:
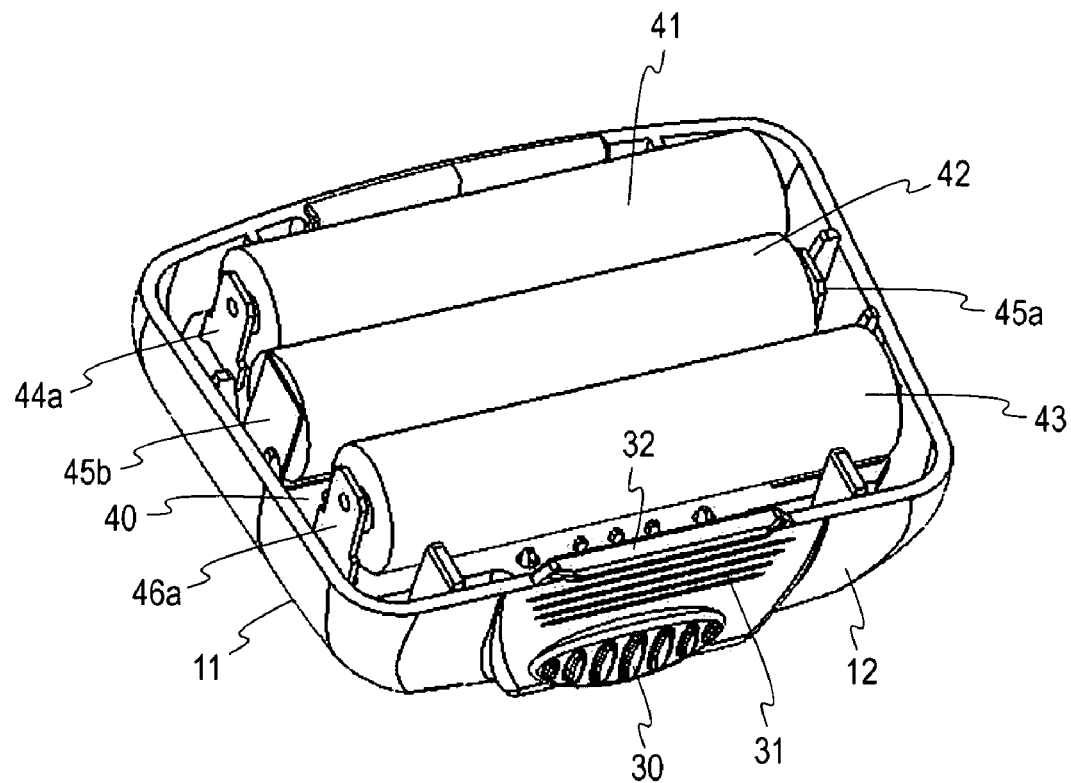
FIG. 6 is a perspective view of the interior of the front section of the dog flashlight of FIGS. 1–5.
Figure 7:
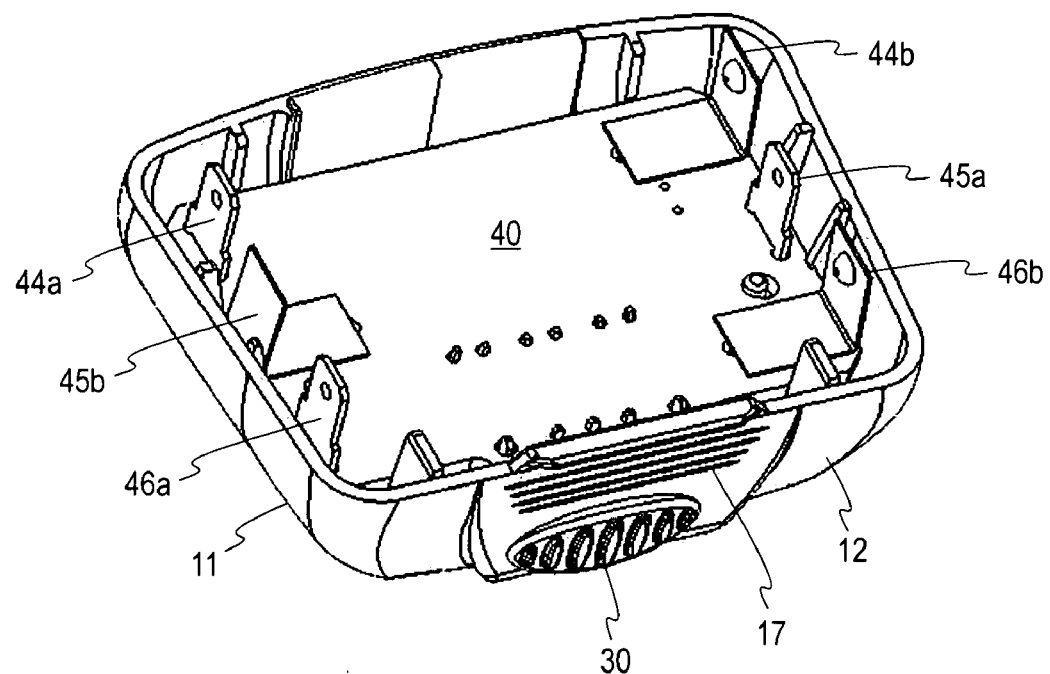
FIG. 7 is the same perspective view shown in FIG. 6 with the batteries removed.

FIG. 6 shows the interior of the front housing section 12, which contains an internal circuit board 40. Three 1.5-volt alkaline batteries 41, 42 and 43 are mounted on is the rear side of the circuit board 40, making contact with three pairs of conventional battery terminals 44a and 44b, 45a and 45b, and 46a and 46b attached to the circuit board 40. FIG. 7 is the same view as FIG. 6 with the batteries removed to more clearly show the battery terminals and their attachments to the circuit board 40.

Figure 8:
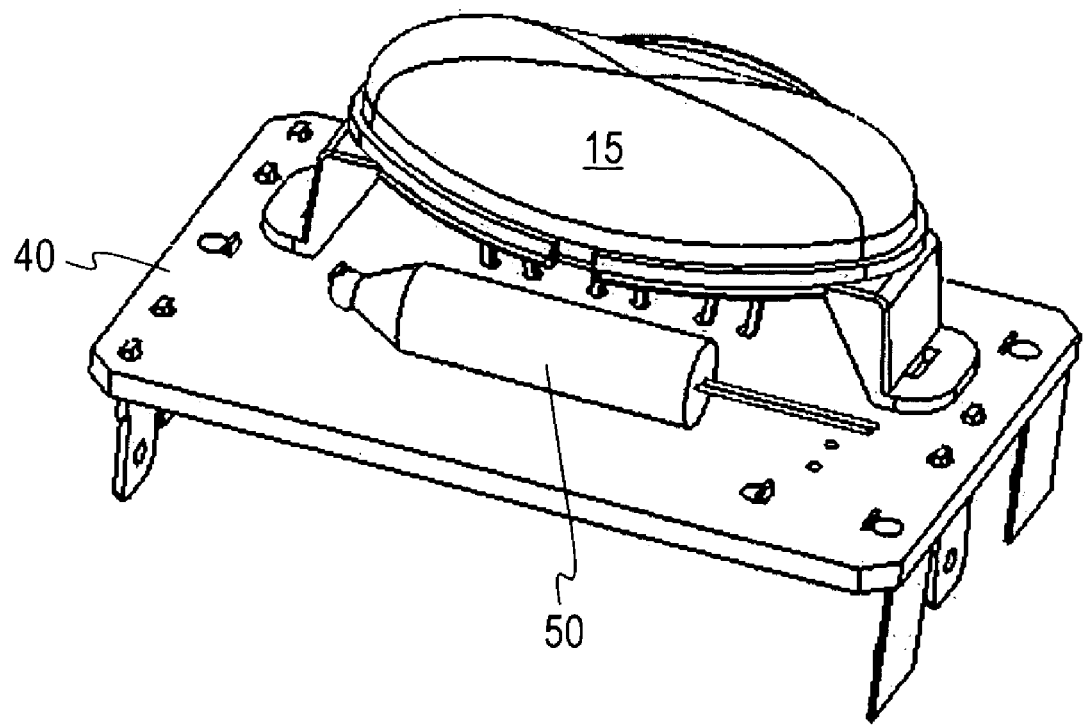
FIG. 8 is a perspective view of the front side of the circuit board contained in the front section of the dog flashlight of FIGS. 1–7.
Figure 9:
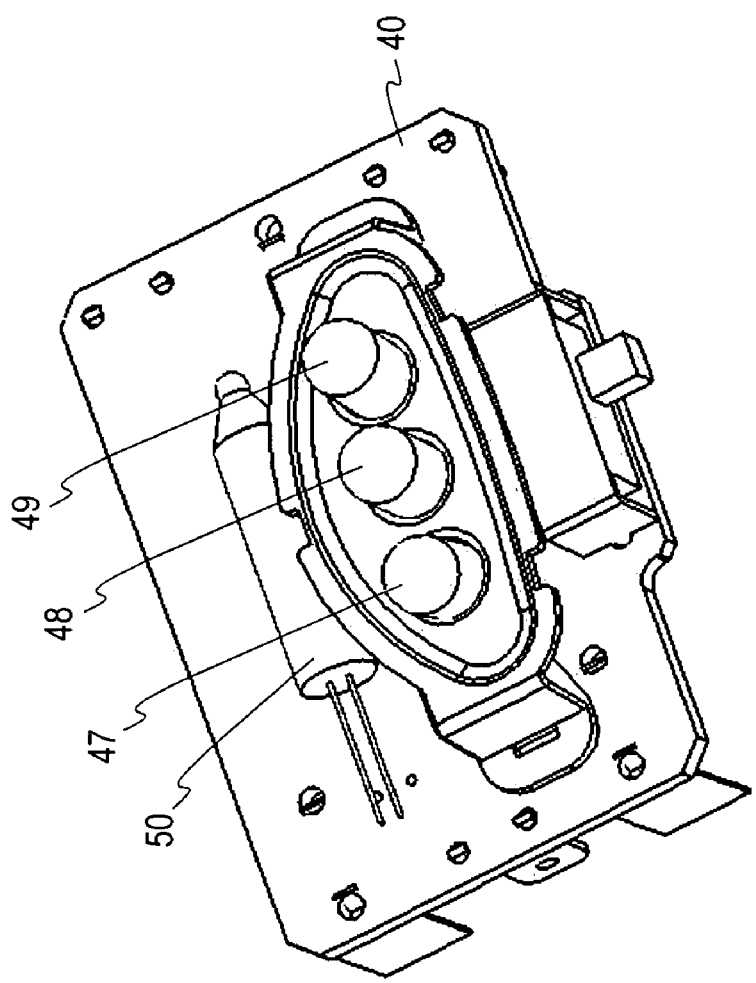
FIG. 9 is another perspective view of the front side of the circuit board contained in the front section of the dog flashlight of FIGS. 1–7, with the lens removed.

FIGS. 8 and 9 show the circuit board 40 without the housing. It can be seen that the lens 15 is mounted on the front side of the board 40, and three light emitting diodes (LEDs) 47, 48 and 49 are mounted on the board directly below the lens 15 (see FIG. 9). The center LED 48 is positioned to emit a light beam directed straight forward, while the two side LEDs 47 and 49 are positioned to emit light beams directed slightly outwardly on opposite sides of the dog's snout. The LEDs preferably emit white light with about 10,000 medium intensity. This combination of light beams is capable of illuminating an area extending as far as 200 feet in front of the dog, with a beam width that is at least 5 feet wide at a distance of about 10 feet in front of the dog. It will be understood that the LEDs may be varied in both number and size, but it is preferred that the source or sources be sufficient to illuminate an area extending at least 10 feet, most preferably at least 20 feet, in front of the dog.

An incandescent lamp 50 is also mounted on the front side of the board 40, for a purpose to be described below. Finally, the on/off switch 30 is also mounted on the front side of the board 40, adjacent the bottom edge of the board.

Figure 10:
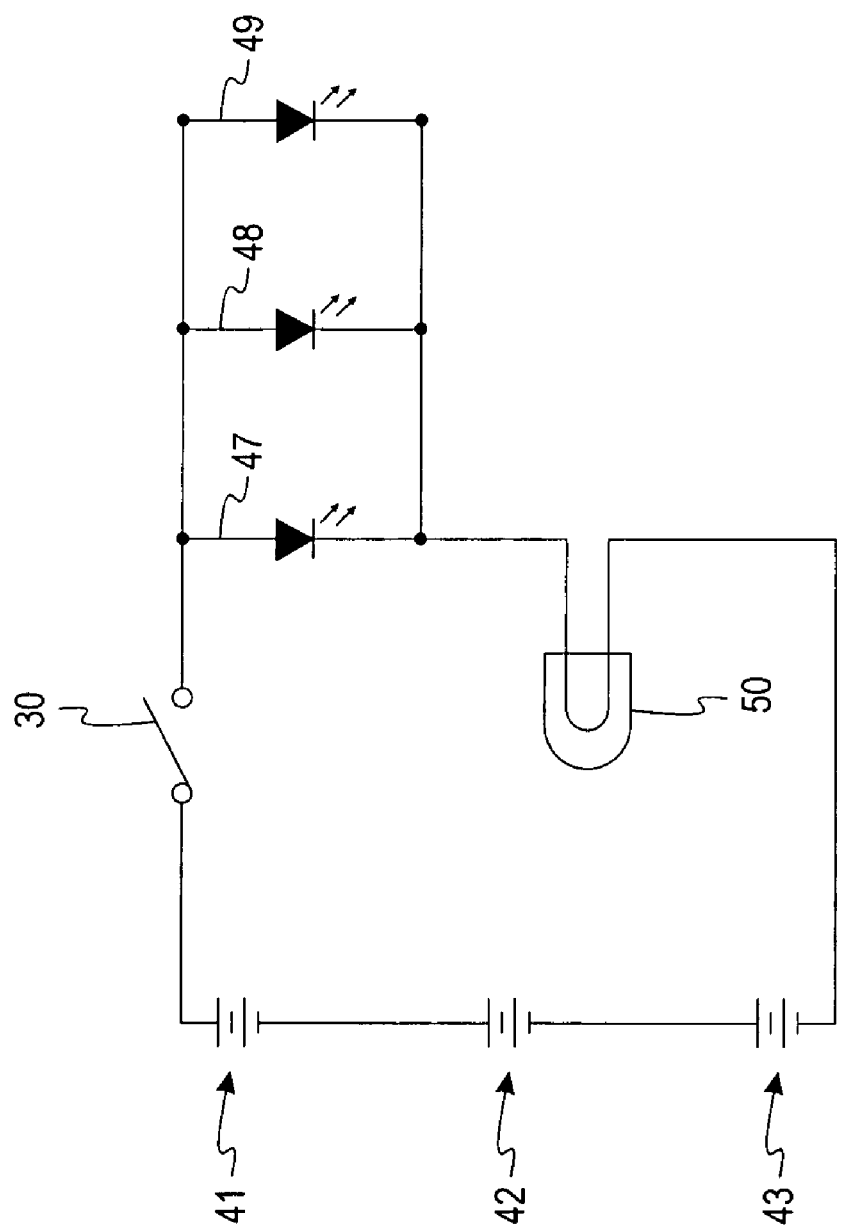
FIG. 10 is an electrical schematic of the electrical circuit contained in the dog flashlight of FIGS. 1–9.

FIG. 10 is a schematic diagram of the electrical circuit provided the circuit board 40 to interconnect the various components mounted thereon. The three 1.5-volt alkaline batteries (AAA) 41–43 are electrically connected in series to provide 4.5 DC volts to the circuit through a sliding SPST on/off switch 30. The three white LEDS 47–49 are connected in parallel with each other and in series with the switch 30 so that all three LEDs are illuminated when the switch 30 is turned closed. The incandescent, tungsten-filament lamp 50, of the kind used for ornamental lighting, e.g., as in Christmas tree light string, is used as a constant current ballast resistor in the circuit. The current flowing through the tungsten filament of the lamp 50 varies with the available voltage from the batteries 41–43 due to the positive temperature coefficient of the filament, thereby providing a substantially constant amount of current to the LEDs 47–49. By using the incandescent lamp 50 as a variable resistor, the life of the batteries is extended and the intensity of the white LEDs 47–49 is more uniform over the life of the batteries 41–43.

Figure 11:
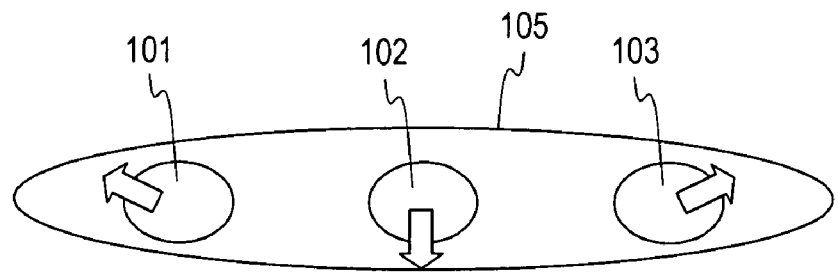
FIG. 11 is a diagrammatic front elevation of a dog flashlight for attachment to a dog collar, according to another modified embodiment of the invention.
Figure 12:
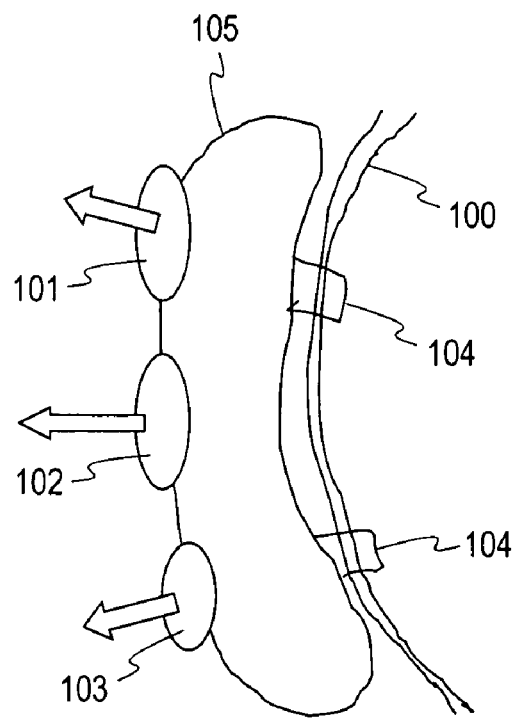
FIG. 12 is diagrammatic side perspective of the dog flashlight of FIG. 11.

FIGS. 11 and 12 illustrate a modified embodiment of the invention for attachment directly to a dog collar 100. This embodiment utilizes three LEDs 101–103 with the center LED 102 emitting a light beam directed straight forward and slightly upwardly, and with the two end LEDs emitting light beams directed upwardly and outwardly to avoid blockage from the dog's snout. The dog collar 100 passes through loops 104 on the rear wall of the flashlight housing 105.

When LEDs attached directly to a dog collar are slanted up, the nose of the dog gets in the way and forms a shadow. Therefore, the middle LED 102 is set straight so that it shines down on the ground in front of the dog, and the two side LEDs 101 and 103, which are spaced approximately an inch from the middle LED 102, are slanted upwardly so that they shine straight around the dog's nose.

Figure 13:
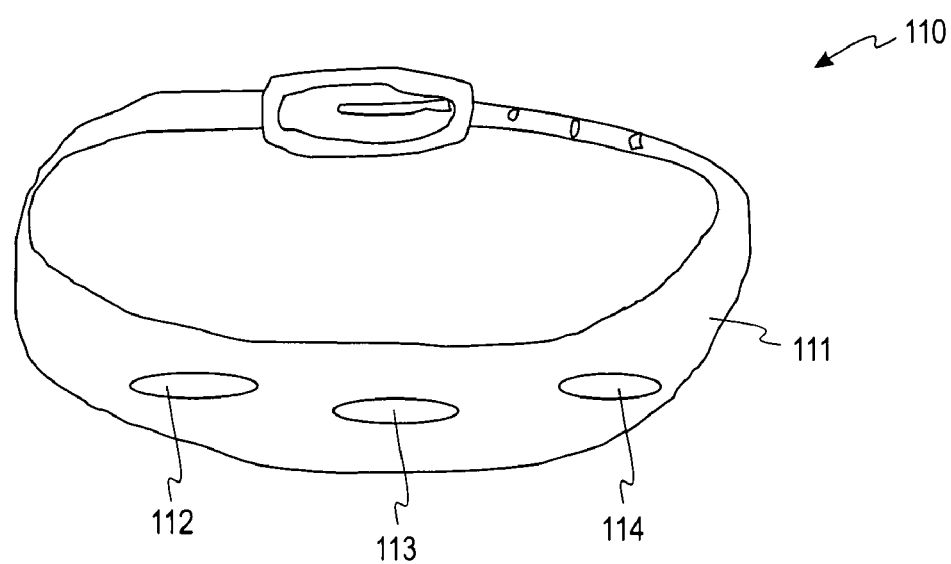
FIG. 13 is a diagrammatic front perspective of a dog flashlight integrated into a dog collar, according to another modified embodiment of the invention.

Turning now to FIG. 13, a dog collar flashlight 110, according to another embodiment of the present invention, is embedded in a dog collar 111. Three LEDs 112–114 are utilized. The battery power source and on/off switch are not visible in this view.

Figure 14:
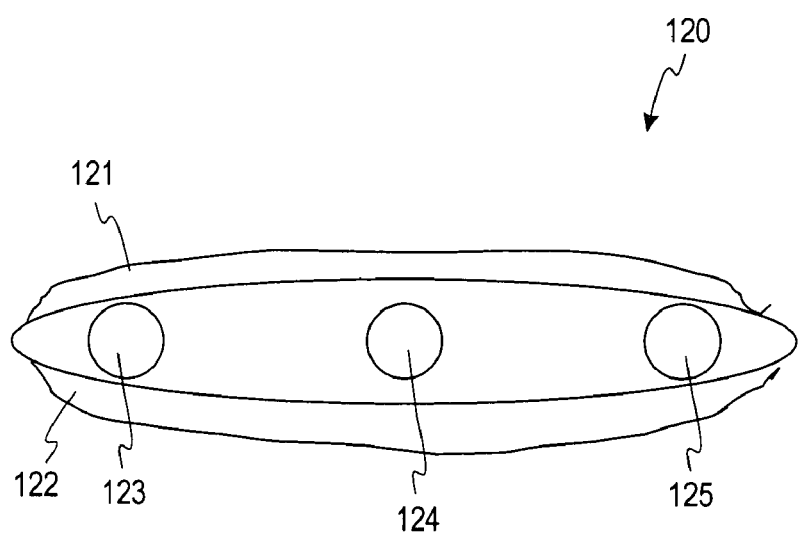
FIG. 14 is a diagrammatic front elevation of a dog flashlight that includes a hair guard, according to another modified embodiment of the invention.
Figure 15:
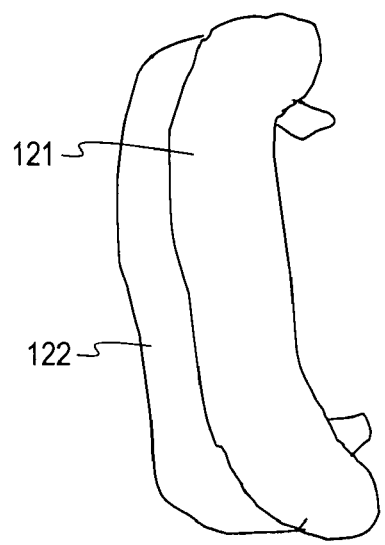
FIG. 15 is a diagrammatic side perspective of the dog flashlight of FIG. 14.

FIGS. 14 and 15 show a dog collar flashlight 120, according to another embodiment of the present invention, fitted with rims 121 and 122 that act as hair guards to keep the dog's hair from obscuring the three LEDs 123–125.

Figure 16:
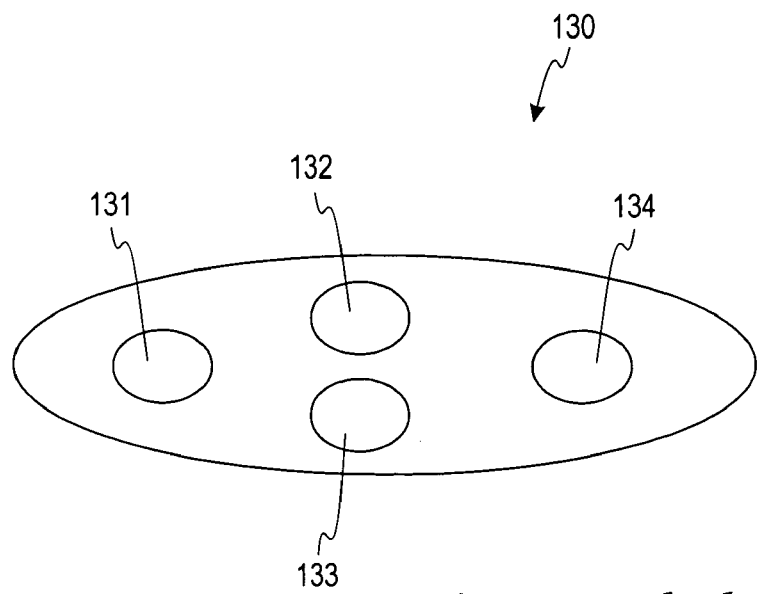
FIG. 16 is a diagrammatic front elevation of a dog flashlight incorporating four LED light sources, according to another modified embodiment of the invention.
Figure 17:
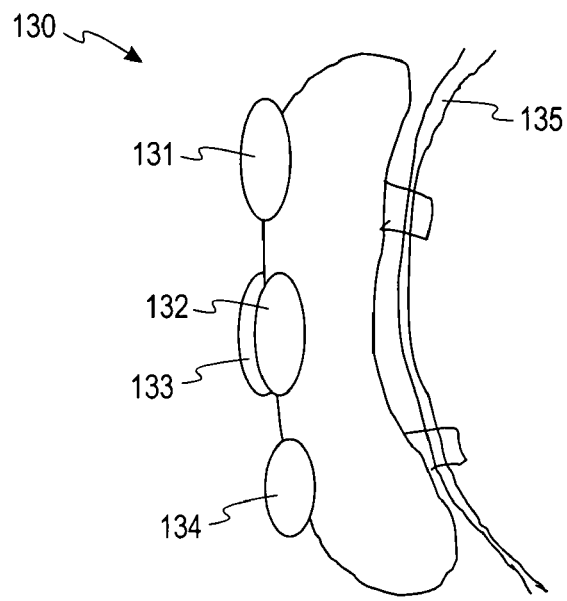
FIG. 17 is a diagrammatic side perspective of the dog flashlight of FIG. 16.
Figure 18:
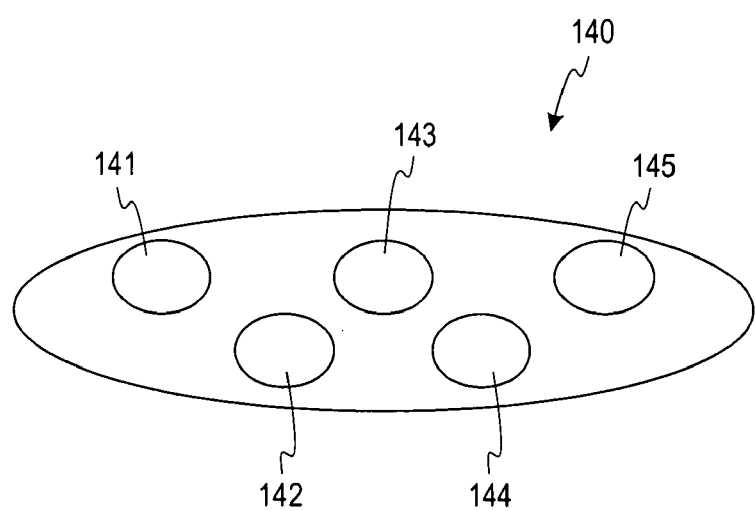
FIG. 18 is a diagrammatic front elevation of a dog flashlight incorporating five LED light sources, according to another modified embodiment of the invention.
Figure 19:
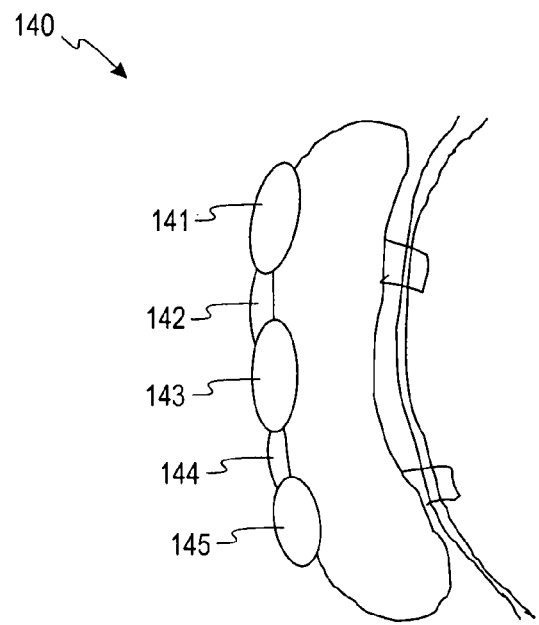
FIG. 19 is a diagrammatic side perspective of the dog flashlight of FIG. 18.

FIGS. 16 and 17 show a dog collar flashlight 130 similar to the embodiment of FIG. 13 but using four LEDs 131–134. The two center LEDs 132 and 133 shine in a forward direction, providing more illumination directly in front of the pet wearing the collar 135. FIGS. 18 and 19 show a similar dog collar flashlight 140 having five LEDs 141–145. The center LED 143 shines straight forward, while the LEDs 141 and 142 illuminate the area to the pet's left side and the LEDs 144 and 145 illuminate the area to the pet's right side.

Figure 20:
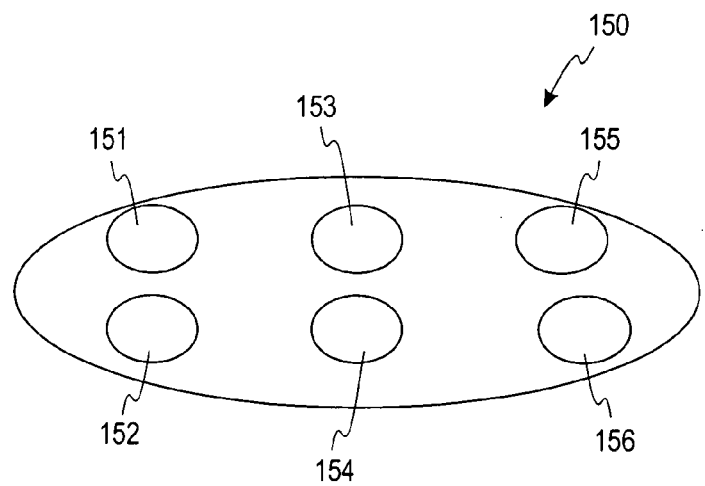
FIG. 20 is a diagrammatic front elevation of a dog flashlight incorporating six LED light sources, according to another modified embodiment of the invention.
Figure 21:
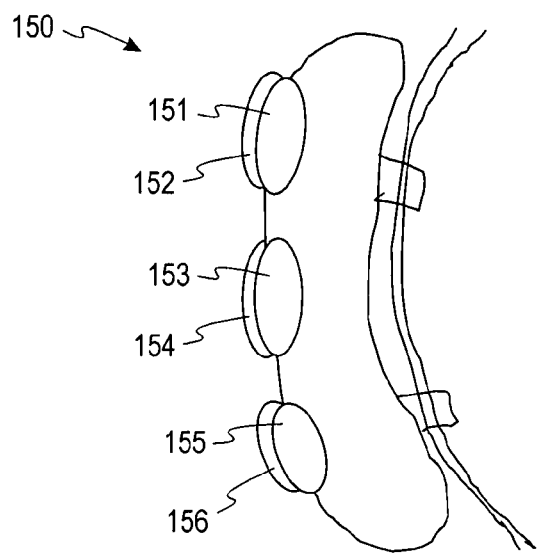
FIG. 21 is a diagrammatic side perspective of the dog flashlight of FIG. 20.

FIGS. 20 and 21 show a dog collar flashlight 150 having six LEDs 151–156. The center LEDs 153 and 154 illuminate the area directly ahead of the pet while the side LEDs illuminate the respective side areas of the pet wearing the collar flashlight 150.

Figure 22:
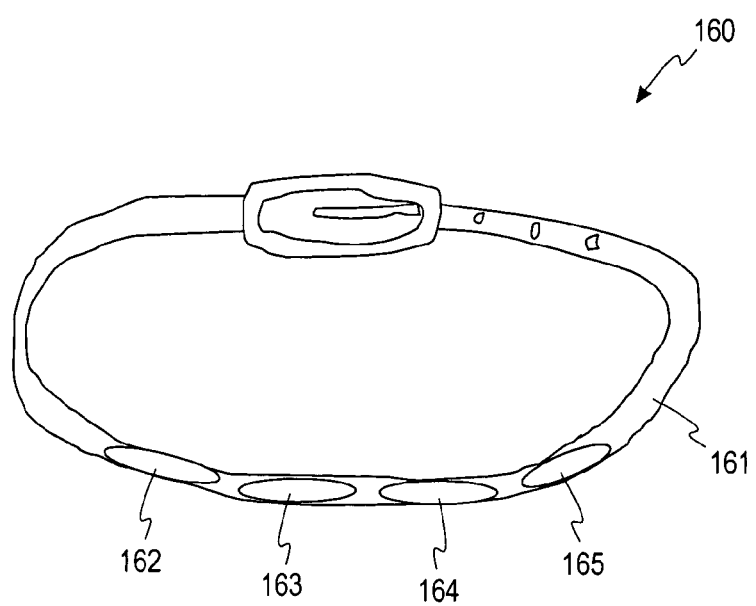
FIG. 22 is a diagrammatic front perspective of a dog flashlight integrated into a dog collar with four LEDs, according to another modified embodiment of the invention.

FIG. 22 shows a dog collar flashlight 160 embedded in a dog collar 161 and utilizing four LEDs 162–165. The two central LEDs 163 and 164 shine forward, while the two peripheral LEDs 162 and 165 shine up and out towards their respective sides.

Figure 23:
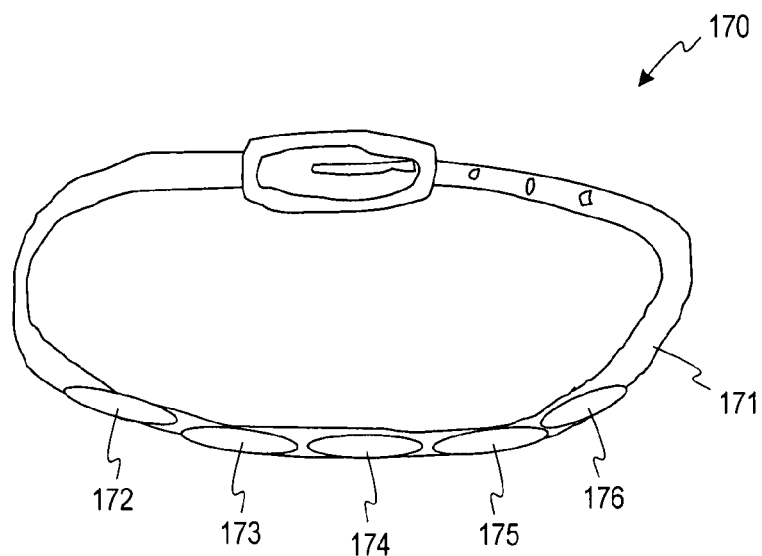
FIG. 23 is a diagrammatic front perspective of a dog flashlight integrated into a dog collar with five LEDs, according to another modified embodiment of the invention.
Figure 24:
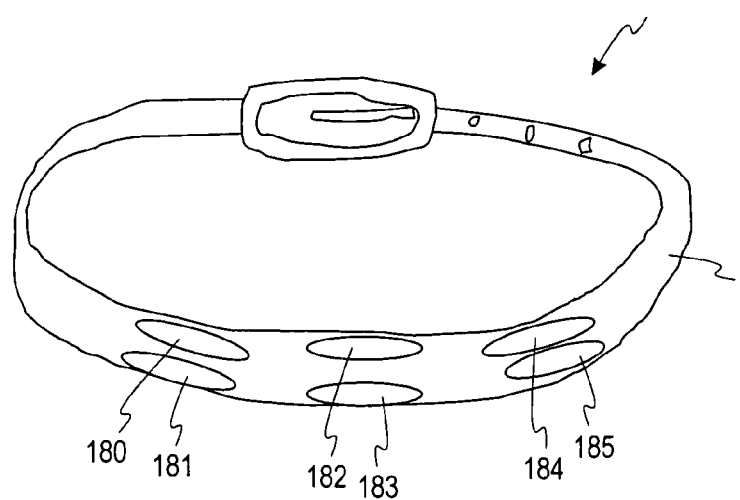
FIG. 24 is a diagrammatic front perspective of a dog flashlight integrated into a dog collar with six LEDs, according to another modified embodiment of the invention.

In FIG. 23, a dog collar flashlight 170 embedded in a dog collar 171 uses five LEDs 172–176. The central LED 174 shines forward, while the four peripheral LEDs 172–173 and 175–176 shine up and out towards their respective sides. FIG. 24 shows a similar arrangement utilizing six LEDs 180–185. The central LEDs 182–183 shine directly forward, while the peripheral LEDs 180–181 and 184–185 shine up and out towards their respective sides.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of illuminating the area in front of a dog in dark conditions, eliminating the need for a dog owner to carry and direct a light source, comprising:

attaching to the neck of the dog a housing containing at least one light source, a battery power supply for said light source, and a switch connected between said light source and said power supply for energizing and de-energizing said light source, said light source comprises three laterally spaced light emitting diodes, the two outboard diodes oriented to direct light forwardly past opposite sides of the dog's snout, and the central diode oriented to direct light forwardly and downwardly, wherein said light source, when energized, is of sufficient brightness to illuminate the area in front of said dog so that said dog owner can observe the illuminated area for control purposes.

2. A method of illuminating the area in front of a dog in dark conditions, eliminating the need for a dog owner to carry and direct a light source, comprising:

attaching to the neck of the dog a band surrounding the neck of the dog, and attached to a connector having an upper end configured to fit over said band and a lower end forming a hinged connection to a housing containing at least one light source, a battery power supply for said light source, and a switch connected between said light source and said power supply for energizing and de-energizing said light source, wherein said light source, when energized, is of sufficient brightness to illuminate the area in front of said dog so that said dog owner can observe the illuminated area for control purposes.

3. A dog flashlight for illuminating the area in front of a dog in dark conditions, eliminating the need for a dog owner to carry and direct a light source, comprising:

a housing containing at least one light source, a battery power supply for said light source, and a switch connected between said light source and said power supply for energizing and de-energizing said light source, said light source comprises three laterally spaced light emitting diodes, the two outboard diodes oriented to direct light forwardly past opposite sides of the dog's snout, and the central diode oriented to direct light forwardly and downwardly, and an attachment device including a band for carrying said housing and adapted to surround the neck of the dog so that said housing is located in front of the chest of the dog, wherein said light source, when energized, is of sufficient brightness to illuminate the area in front of said dog so that said dog owner can observe the illuminated area for control purposes.

4. A dog flashlight for illuminating the area in front of a dog in dark conditions, eliminating the need for a dog owner to carry and direct a light source, comprising:
   a housing containing at least one light source, a battery power supply for said light source, and a switch connected between said light source and said power supply for energizing and de-energizing said light source, and
   an attachment device including a band for carrying said housing and adapted to surround the neck of the dog so that said housing is located in front of the chest of the dog,
   wherein said light source, when energized, is of sufficient brightness to illuminate the area in front of said dog so that said dog owner can observe the illuminated area for control purposes, and
   a connector having an upper end configured to fit over said band and a lower end forming a hinged connection to said housing.

5. A method of illuminating the area in front of a dog in dark conditions, eliminating the need for a dog owner to carry and direct a light source, comprising:
   attaching to the neck of the dog a housing containing at least one light source, a battery power supply for said light source, and a switch connected between said light source and said power supply for energizing and de-energizing said light source, said housing being attached to the neck of said dog by a band surrounding the neck of the dog and connected to said housing by an attachment device having a first portion adapted to be attached to said band and a second portion attached to said housing, said first and second portions being pivotally connected to each other to permit adjustment of the elevation angle of the light beam emitted by said light source in said housing,
   wherein said light source, when energized, is of sufficient brightness to illuminate the area in front of said dog so that said dog owner can observe the illuminated area for control purposes.

6. A dog flashlight for illuminating the area in front of a dog in dark conditions, eliminating the need for a dog owner to carry and direct a light source, comprising:
   a housing containing at least one light source, a battery power supply for said light source, and a switch connected between said light source and said power supply for energizing and de-energizing said light source, and
   an attachment device including a band for carrying said housing and adapted to surround the neck of the dog so that said housing is located in front of the chest of the dog, said attachment device having a first portion adapted to be attached to said band and a second portion attached to said housing, said first and second portions being pivotally connected to each other to permit adjustment of the elevation angle of the light beam emitted by said light source in said housing.

* * * * *